Patented Sept. 15, 1931

1,823,849

UNITED STATES PATENT OFFICE

FRITZ ROTHE AND HANS BRENEK, OF BERLIN, GERMANY, ASSIGNORS TO THE FIRM: RHENANIA-KUNHEIM VEREIN CHEMISCHER FABRIKEN A. G., OF BERLIN, GERMANY, A CORPORATION OF GERMANY

PROCESS FOR THE MANUFACTURE OF MANURES

No Drawing. Application filed January 27, 1927, Serial No. 164,121, and in Germany February 1, 1926.

This invention relates to a method of making fertilizer by calcining phosphates.

It has already been proposed to make fertilizer by calcining at temperatures between 800 and 1500° C. mixtures having any desired composition of crude phosphate, silica or substances containing silica, lime, alkaline reacting alkali-metal compounds or rocks containing alkali-metal compounds such as leucite, phonolite or the like. A special fertilizer making process of the above described kind consists in heating phosphorites in presence of silica and alkali-metal salts especially alkali-metal carbonate at temperatures of decomposition with the proviso that there should be present about such an amount of silica as is required for converting 1 mol. CaO of the tricalciumphosphate into a silicate of the combination $2CaO.SiO_2$ and at least such an amount of alkali-metal salts as corresponds to the molecular proportion of one alkali-metal oxide to one phosphoric acid anhydride.

It has been found that sometimes the desired opening up of the phosphoric acid failed, that is to say, the conversion into the form soluble in citrate (according to Petermann) did not take place more particularly when crude phosphates were used which contained considerable quantities of calcium fluoride.

A similar unfavorable action is also brought about by the presence of any considerable quantities of gypsum in the crude phosphate.

The disturbance of the opening up process occurs more particularly owing to the fact that when the substances in question are present, the reaction mixture frequently becomes molten before the reaction temperature of about 1200° C. is reached.

It has now been found that the above-mentioned disadvantages are avoided by carrying out the opening up process in the presence of steam. Apparently owing to the action of the steam, the fluorine or the sulphuric acid or both, are expelled, or the expulsion of these substances is facilitated, and their interference with the opening up is thereby eliminated. It has been further found advisable, for the purpose of facilitating the decomposition of the gypsum to add to the mixture to be calcined small quantities of reducing substances, such as for instance, coal.

It is true that it has been already proposed in the manufacture of calcined phosphates to carry out the calcining process in the presence of steam. In this known process, alkali carbonates are not however used, but only alkali chlorides, and the steam in the same is intended to expel the chlorine from the alkali chloride, in the form of hydrochloride. It was by no means possible to deduce from this known process the favorable action of steam when working with alkali-metal compounds with alkaline reaction such as carbonates or hydroxides.

Finally, it has also been found that when using crude phosphates with a small proportion of fluorine, the use of steam has advantages, as the opening up process is favorably affected by steam in every case. The calcined products obtained are entirely, or almost entirely, free from fluorine, and the degree of expulsion of the fluorine may be regarded as the criterion for the degree of opening up.

The steam required for the reaction may be supplied either as such, or for the production of the temperature required for the calcining process fuel may be used, such as for instance, water gas, oil etc. which on being burnt, supplies the required steam.

Example: A mixture consisting of 100 parts of a North African phosphate containing 65.5% $Ca_3(PO_4)_2$, 15.5% $CaCO_3$, 3.2% $SiO_2$, 4.2% $CaF_2$ and 5.4% $CaSO_4$ with 10 parts sand and 22.5 parts sodium carbonate, was heated in a rotary tubular furnace which was heated by means of a furnace of the usual kind using dry coal dust. The mixture began to melt at about 1050° C. and became already fairly fluid at 1080°. The product of calcining contained 18.4% citrate-soluble phosphoric acid for the 25.1% total phosphoric acid, and 3.2$SO_3$ and 1.2% F.

The same mixture was heated in the same conditions in the presence of steam. It was possible to heat to about 1300° C., without any melting taking place. The calcination product heated to a temperature of only 1050–1080° C. contained 26.9% phosphoric acid soluble in citrate, for a total of 27.2% of phosphoric acid, and was free from $SO_3$ and F.

We claim:

1. A method for making a fertilizer from a raw phosphate containing calcium fluoride or calcium sulfate or both which consists in heating to temperatures of about 1200° C. and in presence of steam a mixture of the raw phosphate, silica and alkali-metal carbonate containing about such amounts of $P_2O_5$, CaO, $SiO_2$, and at least such an amount of alkali-metal oxide as would be present in a mixture of $Ca_2$, $Na_2$, $P_2O_5$ with $Ca_2 SiO_4$, having the same content of $P_2O_5$ and CaO as the raw phosphate employed.

2. A method for making a fertilizer from a raw phosphate containing calcium fluoride or calcium sulfate or both which consists in heating to temperatures of about 1200° C. and in presence of steam a mixture of the raw phosphate, silica and sodium carbonate containing about such amounts of $P_2O_5$, CaO, $SiO_2$, and at least such an amount of alkali-metal oxide as would be present in a mixture of $Ca_2$, $Na_2$, $P_2O_5$ with $Ca_2 SiO_4$, having the same content of $P_2O_5$ and CaO as the raw phosphate employed.

3. A method according to claim 1 in which raw phosphate rich in silica is used instead of silica in the mixture to be calcined.

4. A method according to claim 1 in which small amounts of reducing substances are present in the mixture to be calcined.

5. A method according to claim 1 in which small amounts of coal are present in the mixture to be calcined.

6. A method of making fertilizer which consists in heating to about 1080° C. in the presence of steam and in a suitable furnace 100 parts of phosphate containing about 4.2% $CaF_2$ and about 5.4% $CaSO_4$, 10 parts sand and 22½ parts sodium carbonate; thereby obtaining about 18.4% citrate-soluble phosphoric acid, 3.2% $SO_3$ and 1.2% F.

Signed at Berlin, in the county of Mandenburg and State of Prussia, this 13th day of January, A. D. 1927.

FRITZ ROTHE.
HANS BRENEK.